US008072991B2

(12) United States Patent
Pushparaj et al.

(10) Patent No.: US 8,072,991 B2
(45) Date of Patent: Dec. 6, 2011

(54) ALLOCATION OF ROUTE TARGETS BASED ON SERVICE OFFERED

(75) Inventors: Vinodh Pushparaj, Santa Clara, CA (US); Jitendra Varshney, Fremont, CA (US); Quy Lu Nguyen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 603 days.

(21) Appl. No.: 11/782,121

(22) Filed: Jul. 24, 2007

(65) Prior Publication Data
US 2009/0028166 A1  Jan. 29, 2009

(51) Int. Cl.
*H04L 12/28* (2006.01)
(52) U.S. Cl. ........................................ 370/401; 370/392
(58) Field of Classification Search .................. None
See application file for complete search history.

(56) References Cited

U.S. PATENT DOCUMENTS

| | | | |
|---|---|---|---|
| 6,765,921 B1 * | 7/2004 | Stacey et al. | 370/401 |
| 7,136,374 B1 * | 11/2006 | Kompella | 370/352 |
| 7,420,933 B2 * | 9/2008 | Booth et al. | 370/254 |
| 7,450,598 B2 * | 11/2008 | Chen et al. | 370/409 |
| 2003/0099235 A1 * | 5/2003 | Shin et al. | 370/390 |
| 2003/0189932 A1 * | 10/2003 | Ishikawa et al. | 370/392 |
| 2004/0202171 A1 * | 10/2004 | Hama | 370/395.1 |
| 2006/0221813 A1 * | 10/2006 | Scudder et al. | 370/216 |
| 2007/0115962 A1 * | 5/2007 | Mammoliti et al. | 370/389 |

OTHER PUBLICATIONS

MPLS Virtual Private Networks. This feature guide document ("feature module") published Dec. 1999, for Cisco IOS Release 12.0(5)T. San Jose, California.

* cited by examiner

*Primary Examiner* — Chi Pham
*Assistant Examiner* — Kouroush Mohebbi
(74) *Attorney, Agent, or Firm* — Stolowitz Ford Cowger LLP

(57) ABSTRACT

A network controller to allocate route targets for communication services provided on one or more corresponding virtual private networks, the route targets identifying service providers associated with the virtual private networks and the communication services provided by the corresponding virtual private networks.

17 Claims, 4 Drawing Sheets

US 8,072,991 B2

ALLOCATION OF ROUTE TARGETS BASED ON SERVICE OFFERED

FIELD OF THE INVENTION

This invention relates generally to network communications.

BACKGROUND

Many service providers use layer 3 Multi-Protocol Label Switching (MPLS) Virtual Private Networks (VPNs) for customer-based communication. Since service providers often utilize many VPNs to support their networks, management and troubleshooting of these VPNs become increasingly critical.

According to MPLS VPN protocol, service providers assign or allocate route targets to corresponding VPNs. These route targets typically are formatted according to a 6-bit Autonomous System Number (ASN) that expresses a distinct inter-domain routing policy and a 32-bit decimal number representing a range of available values to be associated with route targets for any ASN. Another, less utilized, route target format includes a 32-bit Internet Protocol (IP) address associated with the service provider and a 16-bit decimal number representing a range of available values to be associated with route targets for any IP address.

Most of these service providers manage VPNs with a centralized management system, which, for example, allows for the provisioning and display the route targets on a console. This management technique allows network administrators the ability to receive and view a list of route targets corresponding to a service provider, however, it is often difficult, if not impossible, to manage VPNs or troubleshoot problems associated with one or more VPNs from the list of route targets without intensive computation and holistic knowledge of the centralized management system.

DETAILED DESCRIPTION

Overview

In network communications, a network management system is configured to allocate route targets for communication services provided on one or more corresponding virtual private networks, the route targets identifying service providers associated with the virtual private networks and the communication services provided by the corresponding virtual private networks. Some embodiments are shown and described below in greater detail.

DESCRIPTION

Figure 1:
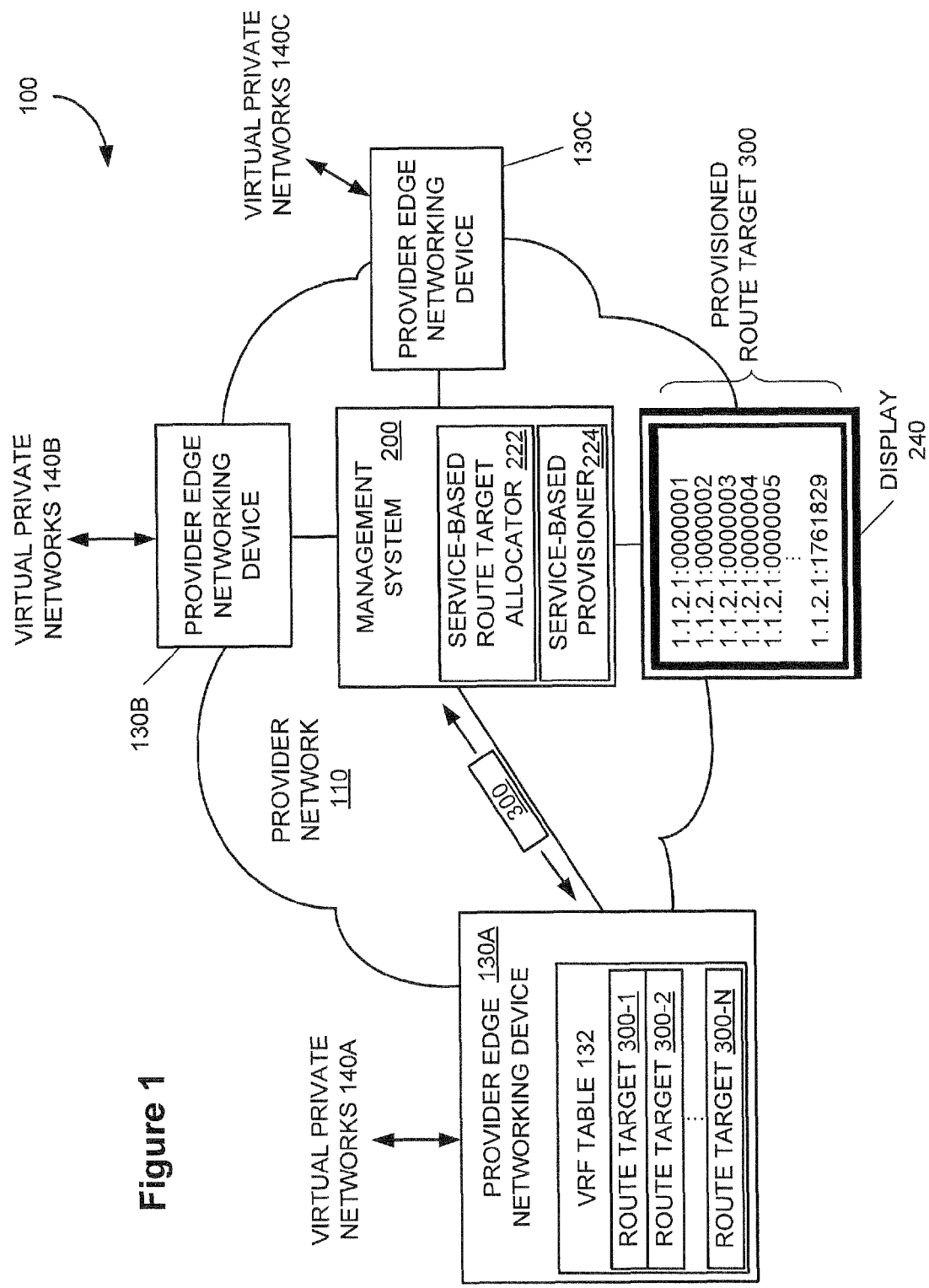
FIG. 1 illustrates an example system implementing service-based route target allocation and provisioning.

FIG. 1 illustrates an example system 100 implementing service-based route target allocation and provisioning. Referring to FIG. 1, the system 100 includes a plurality of provider edge networking devices 130A-130C in a provider network 110 to communicate with one or more customer edge networking devices (not shown). The provider edge networking devices 130A-130C may communicate over one or more virtual private networks (VPNs) 140A-140C, for example, with a layer 3 Multi-Protocol Label Switching (MPLS) VPN protocol. In some embodiments, the provider edge networking devices 130A-130C may be provider edge routers, or any other networking device capable of communicating over virtual private networks 140A-140C. Each provider edge networking device 130A-130C includes a virtual routing and forwarding (VRF) table 132 that stores route targets 300 corresponding to the virtual private networks 140A-140C along with other information facilitating communication by the provider network 110. The route targets 300 may correspond to one or more of the virtual private networks 140A-140C and express distinct communication routes for the virtual private networks 140A-140C.

The provider network 110 includes a management system 200 that communicates with the provider edge networking devices 130A-130B and manages the virtual private networks 140A-140C. The management system 200 includes a service-based route target allocator 222 to generate service-based pools of multiple route targets 300 for allocation or assignment to associated virtual private networks 140A-140C. The service-based route target allocator 222 may import and export the route targets 300 from the provider edge networking devices 130A-130C. In some embodiments, the service-based route target allocator 222 may automatically generate these service-based pools responsive to requests from the service providers to offer a service. The management system 200 may, for example, operate in a computer server that is connects to the provider edge networking devices 130A-130C over the provider network 110.

Each route target 300 in these service-based pools uniquely identifies a service provider corresponding to the associated virtual private network 140A-140C and a service supported by the associated virtual private network 140A-140C. Service providers may be any entity that allows customers or client communication or utilize at least one of the virtual private networks 140A-140C. For instance, when a service provider offers Voice over Internet Protocol (VoIP) over virtual private network 140A, the service-based route target allocator 222 may allocate a pool of route targets 300 that uniquely identify the service provider and the VoIP service provided over virtual private network 140A. In some embodiments, the route targets may indicate other services besides VoIP communications, such as video, voice, internet, multicast, firewall, etc.

Although the above description discusses service-based allocation of route targets, many other allocation schemes may be implemented in conjunction with or separately from a service-based allocation. For instance, the management system 200 may allocate route targets based on VPN topology, such as a hub and spoke distinction or a mesh configuration. Embodiments of these route targets will be described below in greater detail.

The management system 200 may support multiple service providers with various offered services, and the service-based route target allocator 222 may allocate route targets on a per service provider and a per service basis. The management system 200 may also be programmable or configurable to allow the some service providers to implement service-based route target allocation, while allowing other service providers to allocate route targets without indicating an offered service.

The management system 200 includes a service-based provisioner 224 to sort or provision route targets by service provider or by services that the service providers offer, or both. The service-based provisioner 224 may provide the provisioned route targets to a display 240 for display to users or network administrators. In some embodiments, the provisioned route targets 300 may be displayed in an IP-address format (as shown in FIG. 1), for example, where the first two octets of data may represent a service provider associated with the route target 300 and the second two octets of data may represent the service supported by the route target 300.

In some embodiments, the management system 200 may convert data from the route targets into a form that is more presentable when displayed, for example, by deciphering a service provided by a service provider prior to display on the console. By indicating both the service provider and the service offered in the corresponding virtual private networks 140A-140C, the management system 200 may provide route targets to users with a meaningful representation of the virtual private networks 140A-140C.

Figure 2:
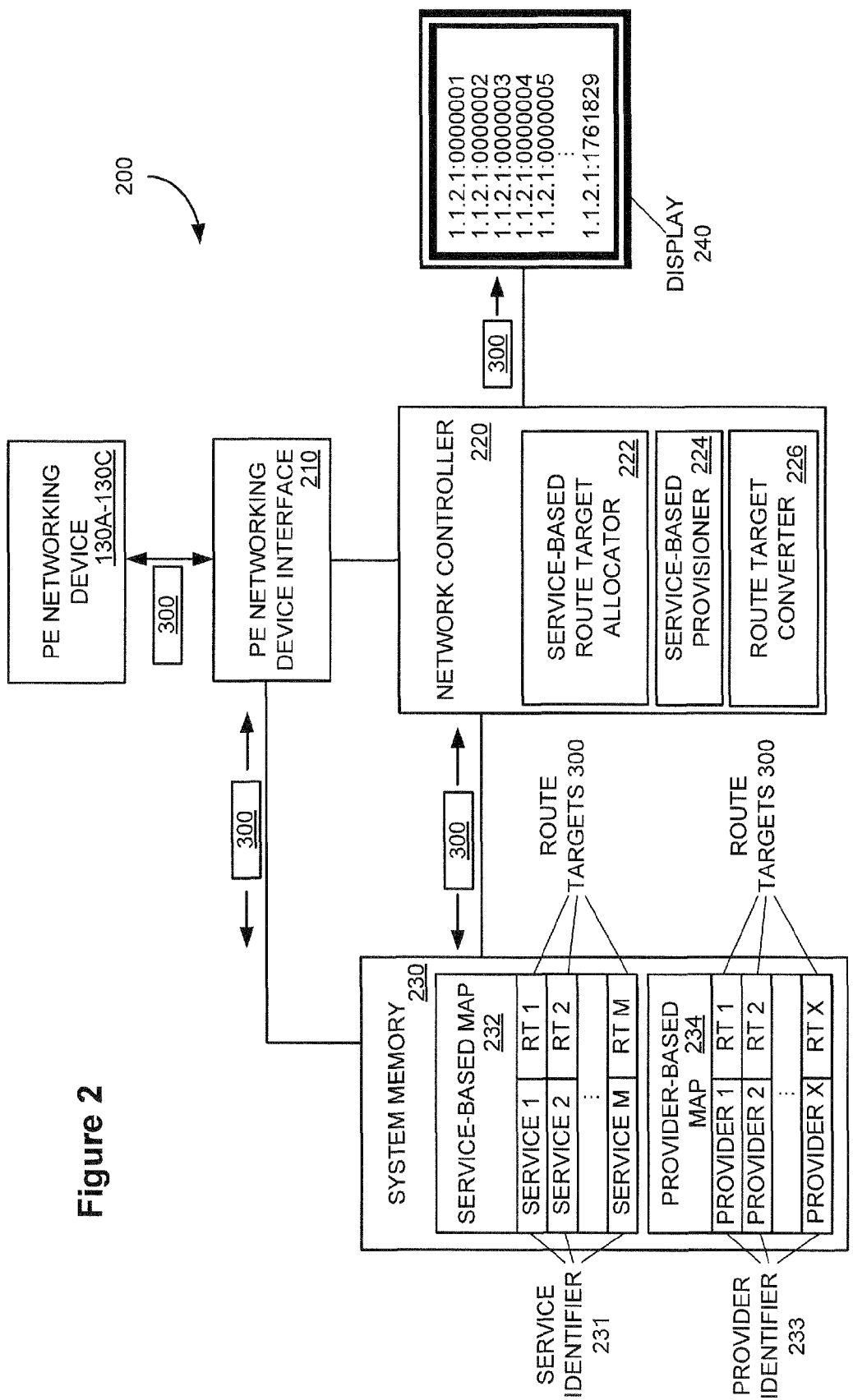
FIG. 2 illustrates example embodiments of a management system shown in FIG. 1.

FIG. 2 illustrates example embodiments of the management system 200 shown in FIG. 1. The management system 200 includes a Provider Edge (PE) networking device interface 210 to couple the management system 200 to the provider edge networking devices 130A-130C. A management system controller 200 controls the operation of the management system 200, and includes the service-based route target allocator 222 and the service-base provisioner 224 described above.

The PE networking device interface 210 may import and export route targets 300 to the provider edge networking devices 130A-130C. The management system 200 includes a system memory 230 may exchange route targets 300 with the PE networking device interface 210 and the network controller 220.

The system memory 230 may include a service-based map 232 and a provider-based map 234. The service-based map 232 may include a mapping of the service 231 associated with a virtual private network 140A-140C and a service-based encoding present in the route target. The provider-based map 234 may include a mapping of the service provider 233 associated with a virtual private network 140A-140C and a provider-based encoding present in the route target. The management system controller 200 may access the system memory 230 and allocate route targets 300 according to data stored in the service-based map 232 and/or the provider-based map 234. For instance, when allocating a route target 300 for a firewall service, the route target allocator 222 may reference the service-based map 232 according to the firewall service and locate the identifier 231 of the firewall service that can be integrated into the route target 300.

The management system 200 includes a route target converter 226 to convert route targets 300 into a format more conducive for display. For instance, in some embodiments, route targets 300 may be include an indication of the service-offered or topology of the VPN, and the route target converter 226 may convert this indication to a format that more clearly indicates the service provider, the service offered, and/or the VPN topology.

The route target converter 226 may utilize the service-based map 232 and/or the provider-based map 234 to perform conversions on the route targets 300. For instance, when converting a service identifier 231 in a route target 300, the route target converter 226 may reference the service-based map 232 according to the service identifier 231 to locate the service that can corresponds with the service identifier. The system memory 230 may include more maps for different features present within the route targets, such as VPN topology.

The management system 200 may include a display 240 to present the provisioned (and possibly converted) route targets. For instance, in FIG. 2, the display 240 is presenting multiple route targets 300 in an IP-format that are received from the network controller 220. In this format, the service provider associated with the route target 300 is identified by the first two octets of data, i.e., 1.1., while the service supported is identified by the last two octets of data, i.e., 2.1. In some embodiments, the management system controller 220 may control the display 240 and/or provide the provisioned route targets 300 to the display 240.

Figure 3A:
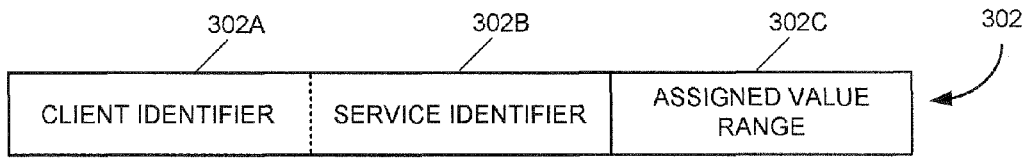
FIGS. 3A-3D illustrates example embodiments of route target formats.

FIGS. 3A-3D illustrates example formats for route target formats 300. Referring to FIG. 3A, a route target 302 may include explicit fields, such as a client identifier 302A, a service identifier 302B, and an assigned value range 302C. The client identifier 302A may uniquely identify a service provider corresponding to a virtual private network 140A-140C, and may be an Autonomous System Number (ASN) that expresses a distinct inter-domain routing policy, a modified version of the ASN, or any other identifier that uniquely identifies the service provider. The provider-based map 234 (FIG. 2) may map the client identifier 233 in route target format 300A to the service provider or client associated with the virtual private network 140A-140C.

The service identifier 302B in route target format 300A may identify a service supported by a virtual private network 140A-140C. The service-based map 232 (FIG. 2) may map the service identifier 302B in route target 302 to the service supported by the virtual private network 140A-140C associated with the route target 302.

The route target 302 may also include an assigned value range 302C representing a range of available values to be allocated. For instance, when the assigned value range 302C is a 16-bit decimal number, the management system 200 (FIGS. 1 and 2) may allocate approximately 32,728 route targets for each client identifier 302A and service identifier 302B pair.

Figure 3B:
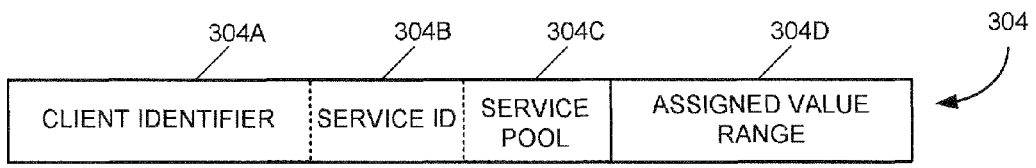

Referring to FIG. 3B, route target 304 is similar to route target 302 with the following differences. Route target 304 may include explicit fields, such as a client identifier 304A, a service identifier 304B, an assigned value range 304D, and a service pool field 304C. The service pool field 304C allows the management system 200 to indicate a service pool associated with each service identifier 304B and client identifier 304B pair. The service pool field 304C allows the number of route targets 300 allocated for a given client identifier 304A and service identifier 304B pair to increase by a multiple of the possible number of service pools. For instance, when an assigned value range is depleted for one service pool associated with a given client identifier 304A and service identifier 304B pair, the service pool field may be incremented to establish a new assigned value range for allocating route targets 300 to the same client identifier and service identifier pair. This allows for increased flexibility and scalability in allocating route targets while remaining backwards compatible with existing route target formats.

Figure 3C:
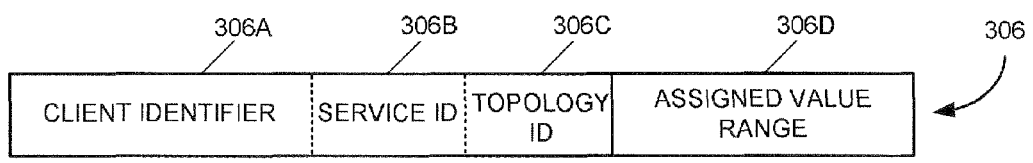

Referring to FIG. 3C, a route target 306 may include explicit fields, such as a client identifier 306A, a service identifier 306B, a topology identifier 306C, and an assigned value range 306D. The topology identifier 306C allows the management system 200 to indicate a topology of an associated virtual private network 140A-140C. The topology identifier 306C may indicate whether the virtual private network 140A-140C has a hub-spoke configuration or implements a mesh topology. In some embodiments, this may implicitly included within the route targets 302 or 304. For instance, the service pool field 306C in the rout target 306 may identify a hub VPN configuration when the service pool field is odd and a spoke VPN configuration when the service pool is even. Although not shown in FIG. 3B, a service pool field 306C may be introduced into route target 306 either explicitly or implicitly.

Figure 3D:
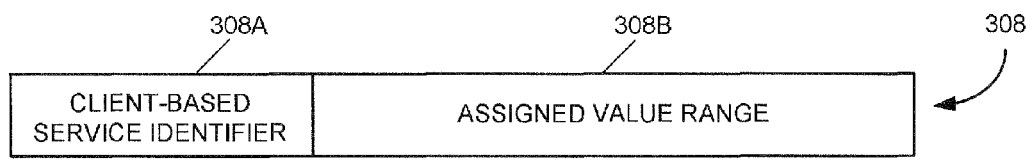

Referring to FIG. 3D, a route target 308 may include a client-based service identifier field 308A to uniquely identify a service provider and a service supported by the associated virtual private network 140A-140C. The client-based service identifier field 308A may implicitly include the service provider and the service supported by the associated virtual private network 140A-140C. By implicit, the client-based service identifier field 308A may not separately show both the service provider and the service supported, but have one number or value that indicates a unique service provider and service supported pairing. In some embodiments, this route target 308 may increase the size of the assigned value range 308B, allowing for a greater number of route targets to be assigned for a given service provider and service. The client-based service identifier 308A may also include an identification of other features, such as VPN topology, in conjunction with or in lieu of the service identification.

Figure 4:
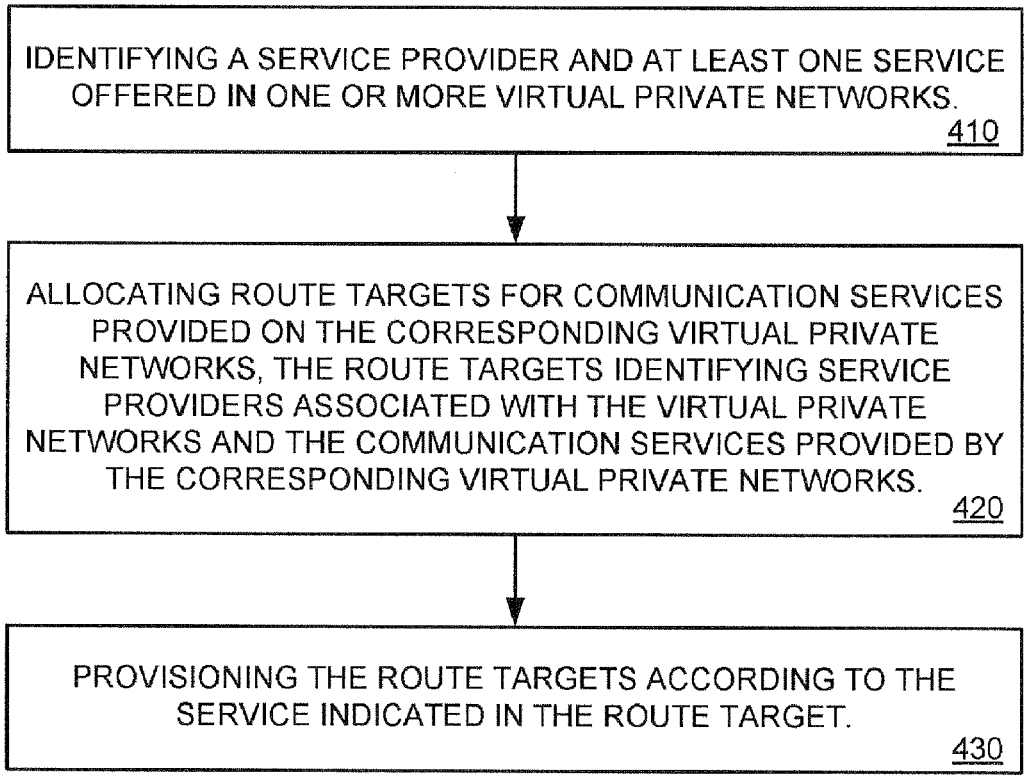
FIG. 4 shows an example method for implementing service-based route target allocation and provisioning.

FIG. 4 shows an example method for implementing service-based route target allocation and provisioning. Referring to FIG. 4, in a block 410, the management system 200 identifies at least one service offered in one or more virtual private networks 140A-140C. The management system 200 may identify the service according to requests from one or more service providers that indicate the services offered in virtual private networks 140A-140C. For instance, a service provider may request the management system 200 allocate a pool of route targets 300 for Internet service that the service provider provides to its customers or clients.

In a block 420, the management system 200 allocates one or more route targets indicating a service supported by the virtual private networks. The management system 200 may allocate route targets with explicit service identifiers as shown in FIGS. 3A-3C, or with an implicit identifier as shown in 3D. The route targets may also include other implicit or explicit identifiers, such as service provider identification, VPN topology, etc.

In a block 430, the management system 200 provisions the route targets according to the service indicated by the route targets. As shown and described above, the management system 200 may include a display to present the provisioned route targets to users or network administrators. In some embodiments, the management system 200 may provision the route targets according to other attributes of the route targets, such as unique service provider and/or VPN topology.

One of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
a network controller to allocate route targets for communication services provided on one or more corresponding virtual private networks by the one or more service providers, where the network controller allocates the route targets according to a layer 3 Multi-Protocol Label Switching (MPLS) virtual private network (VPN) protocol, the route targets expressing distinct communication routes for the virtual private networks, and where the route targets are configured to include one or more service fields populated with at least one identifier to uniquely and explicitly identify which communication services are provided by the one or more service providers on the corresponding virtual private networks and identify which service providers are providing those communication services.

2. The device of claim 1 including a service-based map used by the network controller to decode numbers in the route targets identifying the communication services.

3. The device of claim 2 including a provider-based map used by the network controller to decode numbers in the route targets identifying the service providers.

4. The device of claim 1 where the route targets include a client identification field identifying the service providers associated with the virtual private networks, and a service identification field identifying the communication services provided by the corresponding virtual private networks.

5. The device of claim 4 where the route targets include a topology identification field identifying at least one of a hub configuration, spoke configuration, or mesh topology for the virtual private networks.

6. The device of claim 1 where each of the route targets includes a common identification field that both uniquely identifies the service provider associated with the virtual private network and the communication service provided by the associated virtual private network.

7. A method comprising:
identifying at least one communication service to be provided on one or more corresponding virtual private networks and a service provider that provides the at least one communication service; and
allocating route targets for the identified communication service to be provided on the corresponding virtual private networks by the identified service provider, where the route targets are allocated according to a layer 3 Multi-Protocol Label Switching (MPLS) virtual private network (VPN) protocol, the route targets expressing distinct communication routes for the virtual private networks, where the route targets include one or more service fields populated with at least one identifier explicitly identifying both the service provider to provide the at least one communication service on the virtual private networks and identifying the communication service provided by the service provider on the corresponding virtual private networks.

8. The method of claim 7 includes decoding numbers from the route targets according to a service-based map to identify corresponding communication services indicated by the route targets.

9. The method of claim 7 includes provisioning the route targets according to the communication services indicated in the route target.

10. The method of claim 7 where the route targets include a client identification field identifying the service providers associated with the virtual private networks, and a service identification field identifying the communication services provided by the corresponding virtual private networks.

11. The method of claim 9 where the route targets include a topology identification field identifying at least one of a hub configuration, spoke configuration, or mesh topology for the virtual private networks.

12. The method of claim 7 where each of the route targets includes a common identification field that both uniquely identifies the service provider associated with the virtual private network and the communication service provided by the associated virtual private network.

13. A system comprising:
- a network controller to allocate route targets for communication services provided on one or more corresponding virtual private networks, where the network controller is configured to allocate the route targets according to a layer 3 Multi-Protocol Label Switching (MPLS) virtual private network (VPN) protocol, the route targets expressing distinct communication routes for the virtual private networks, where the route targets include one or more service fields populated with at least one identifier explicitly identifying service providers associated with the virtual private networks and at least the communication services provided by the corresponding virtual private networks or a network topology associated with the virtual private network; and
- a virtual private network provisioning unit to provision multiple route targets according to at least the service supported by the associated virtual private network or the network topology associated with the virtual private network.

14. The system of claim 13 including a memory having a service-based map associating route targets with communication services provided on the corresponding virtual private networks, where the network controller includes a route target converter to decode numbers in the route targets identifying the communication services according to the service-based map.

15. The system of claim 13 where the route targets include a client identification field identifying the service providers associated with the virtual private networks, and a service identification field identifying the communication services provided by the corresponding virtual private networks.

16. The system of claim 13 where the route targets include a topology identification field identifying at least one of a hub configuration, spoke configuration, or mesh topology for the virtual private networks.

17. The system of claim 13 where each of the route targets includes a common identification field that both uniquely identifies a service provider associated with the virtual private network and a service provided by the associated virtual private network.

* * * * *